United States Patent
Lee et al.

(10) Patent No.: US 10,539,824 B2
(45) Date of Patent: Jan. 21, 2020

(54) COLOR CONVERSION PANEL, METHOD OF MANUFACTURING THE SAME, AND DISPLAY DEVICE INCLUDING THE SAME

(71) Applicant: Samsung Display Co., Ltd., Yongin-si (KR)

(72) Inventors: Kwang Ho Lee, Seoul (KR); Yeo Geon Yoon, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/709,559

(22) Filed: Sep. 20, 2017

(65) Prior Publication Data

US 2018/0120631 A1     May 3, 2018

(30) Foreign Application Priority Data

Nov. 1, 2016   (KR) .......................... 10-2016-0144732

(51) Int. Cl.
*G02F 1/1335* (2006.01)
*G02F 1/1362* (2006.01)
*G02F 1/1368* (2006.01)

(52) U.S. Cl.
CPC .. *G02F 1/133516* (2013.01); *G02F 1/133512* (2013.01); *G02F 1/133528* (2013.01); *G02F 1/133555* (2013.01); *G02F 1/1368* (2013.01); *G02F 1/136286* (2013.01); *G02F 2001/133565* (2013.01)

(58) Field of Classification Search
CPC .................................................... G02F 1/1335
See application file for complete search history.

(56) References Cited

U.S. PATENT DOCUMENTS

| 2002/0154257 | A1* | 10/2002 | Iijima | G02F 1/133514 349/67 |
| 2005/0170548 | A1* | 8/2005 | Yoon | G02F 1/133553 438/57 |
| 2007/0076143 | A1 | 4/2007 | Palk et al. | |
| 2008/0055515 | A1* | 3/2008 | Ha | G02B 6/0056 349/61 |
| 2010/0026917 | A1* | 2/2010 | Wen | B60R 1/088 349/1 |
| 2010/0201909 | A1* | 8/2010 | Jung | G02F 1/133528 349/61 |

(Continued)

FOREIGN PATENT DOCUMENTS

KR   10-2010-0111103     10/2010
KR   10-2015-0078305     7/2015

(Continued)

OTHER PUBLICATIONS

Extended European Search Report dated Feb. 9, 2018, in the European Patent Application No. 17199459.3.

*Primary Examiner* — Sang V Nguyen

(74) *Attorney, Agent, or Firm* — H.C. Park & Associates, PLC

(57) ABSTRACT

A color conversion panel includes a substrate, a first color conversion layer and a second color conversion layer disposed on the substrate, a planarization layer covering the first color conversion layer and the second color conversion layer, and a polarization layer disposed on the planarization layer. An outlet from the planarization layer penetrates the polarization layer.

17 Claims, 11 Drawing Sheets

(56) References Cited

U.S. PATENT DOCUMENTS

| | | | | |
|---|---|---|---|---|
| 2011/0128475 A1* | 6/2011 | Park | ................. | G02F 1/133514 |
| | | | | 349/96 |
| 2012/0319222 A1* | 12/2012 | Ozawa | .............. | H01L 27/14605 |
| | | | | 257/432 |
| 2013/0242237 A1* | 9/2013 | Nagato | ............. | G02F 1/133509 |
| | | | | 349/105 |
| 2013/0320328 A1* | 12/2013 | Lee | ..................... | H01L 29/7869 |
| | | | | 257/43 |
| 2014/0145178 A1* | 5/2014 | Lee | .................. | H01L 29/66969 |
| | | | | 257/43 |
| 2015/0047765 A1 | 2/2015 | Vo et al. | | |
| 2016/0041430 A1* | 2/2016 | Lee | ................... | G02F 1/133617 |
| | | | | 349/96 |
| 2016/0091757 A1* | 3/2016 | Miki | ................ | G02F 1/133617 |
| | | | | 349/42 |
| 2016/0161798 A1* | 6/2016 | Lee | .................. | G02F 1/133528 |
| | | | | 349/65 |
| 2016/0313599 A1* | 10/2016 | Kwon | ................ | G02F 1/133514 |
| 2017/0170251 A1* | 6/2017 | Moon | ................ | H01L 27/3262 |

FOREIGN PATENT DOCUMENTS

| | | |
|---|---|---|
| KR | 10-1592481 | 2/2016 |
| KR | 10-2016-0042996 | 4/2016 |

* cited by examiner

COLOR CONVERSION PANEL, METHOD OF MANUFACTURING THE SAME, AND DISPLAY DEVICE INCLUDING THE SAME

CROSS-REFERENCE TO RELATED APPLICATION

This application claims priority from and the benefit of Korean Patent Application No. 10-2016-0144732 filed on Nov. 1, 2016, which is hereby incorporated by reference for all purposes as if fully set forth herein.

BACKGROUND

Field

Exemplary embodiments relate to a color conversion panel, a manufacturing method thereof, and a display device including the color conversion panel.

Discussion of the Background

A liquid crystal display used as a display device includes two electrodes forming an electric field, a liquid crystal layer, a color filter, and a polarizer. Light generated from a light source travels through the liquid crystal layer, the color filter, and the polarizer in order to display an image. However, significant light loss or light leakage occurs from the polarizer and the color filter of a liquid crystal display and from a color filter used in an organic light emitting diode display.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a color conversion panel with reduced light loss from the color conversion panel, a manufacturing method thereof, and a display device including the color conversion panel.

Additional aspects will be set forth in the detailed description which follows, and, in part, will be apparent from the disclosure, or may be learned by practice of the inventive concept.

A color conversion panel according to an exemplary embodiment includes a substrate, a first color conversion layer and a second color conversion layer disposed on the substrate, a planarization layer covering the first color conversion layer and the second color conversion layer, and a polarization layer disposed on the planarization layer. An outlet from the planarization layer penetrates the polarization layer.

The color conversion panel may further include a protection layer disposed on the polarization layer, and the outlet may penetrate the protection layer and the polarization layer.

The color conversion panel may further include an electrode disposed on the protection layer, and the electrode may cover a side surface of the polarization layer and the protection layer in the outlet.

The color conversion panel may further include a light filtering layer disposed between the planarization layer and the polarization layer, the light filtering layer may include a plurality of layers, and the plurality of layers have a structure in which at least two or more layers having different refractive indexes are alternately arranged.

The outlet may penetrate the polarization layer and the light filtering layer.

The color conversion panel may further include an insulating layer disposed between the light filtering layer and the polarization layer.

A first layer closest to the insulating layer among the plurality of layers included in the light filtering layer may be a silicon oxide layer, and the insulating layer may be a silicon nitride layer.

The light filtering layer and the polarization layer may be in contact with each other, and the first layer closest to the polarization layer among the plurality of layers included in the light filtering layer may be the silicon nitride layer.

The color conversion panel may further include a transmission layer disposed on the substrate.

The transmission layer may include a plurality of scattering members.

The color conversion panel may further include a light blocking member disposed between the first color conversion layer and the second color conversion layer, and the light blocking member may have a dual layer of an organic layer and a transflective layer.

The outlet may overlap the light blocking member.

The transflective layer may have a triple layer of indium tin oxide (ITO), silver (Ag), and indium tin oxide (ITO).

A manufacturing method for a color conversion panel according to an exemplary embodiment includes forming a first color conversion layer and a second color conversion layer on a substrate, forming a planarization layer to cover the first color conversion layer and the second color conversion layer, forming a polarization layer on the planarization layer, forming an outlet to penetrate the polarization layer, and forming an electrode on the polarization layer to cover the outlet.

The method may further include: forming an insulating layer between the planarization layer and the polarization layer; and forming a protection layer on the polarization layer, and the outlet may penetrate the protection layer, the polarization layer, and the insulating layer.

The method may further include forming a light filtering layer between the planarization layer and the insulating layer, and the light filtering layer may be formed by stacking at least two or more layers having different refractive indexes from each other.

The method may further include: forming a light blocking member on the substrate before forming the first color conversion layer and the second color conversion layer, DeletedTexts the light blocking member may be disposed between the first color conversion layer and the second color conversion layer, and the forming of the light blocking member includes forming an organic layer on the substrate and forming a transflective layer on the organic layer.

A display device according to an exemplary embodiment a display panel, a color conversion panel overlapping the display panel, and a liquid crystal layer disposed between the display panel and the color conversion panel and including a liquid crystal material. The color conversion panel includes a substrate, a first color conversion layer and a second color conversion layer disposed between the substrate and the liquid crystal layer, a planarization layer disposed between the first color conversion layer and the liquid crystal layer and between the second color conversion layer and the liquid crystal layer, a polarization layer disposed between the planarization layer and the liquid crystal layer, and an electrode disposed between the polarization layer and the liquid crystal layer. The color conversion panel has an outlet from the planarization layer that penetrates the polarization layer. The electrode covers the outlet.

According to exemplary embodiments, defects due to outgassing as the outlet is formed in the color conversion panel may be prevented.

Also, as the light filtering layer made of the plurality of layers may be formed to be flat, the layer may be prevented from being lifted due to the step.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
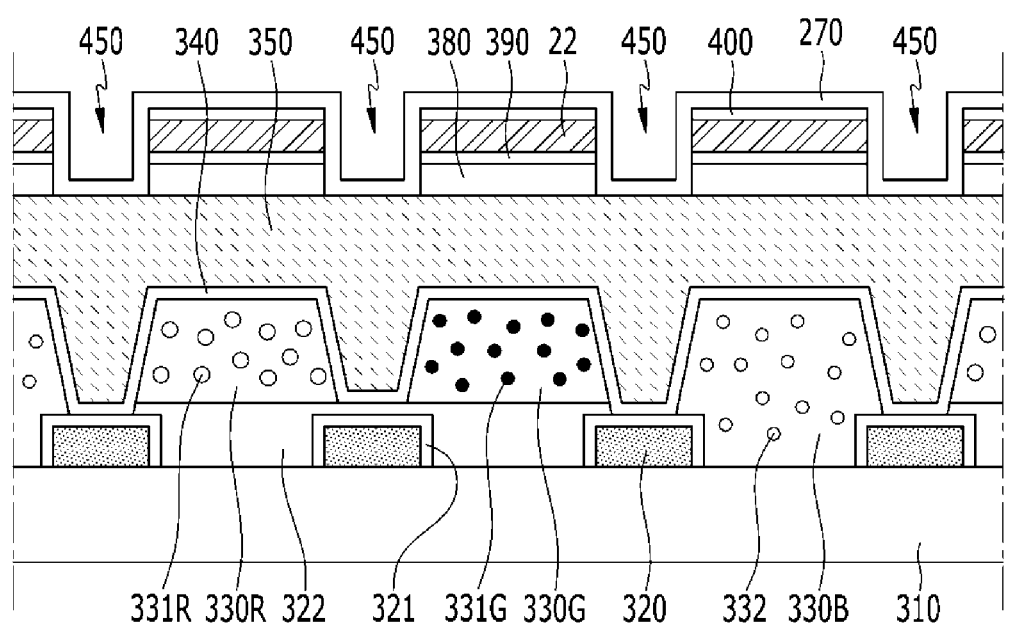
FIG. 1 is a cross-sectional view of a color conversion panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

In a manufacturing process of the display device including a color conversion panel, outgassing is generated due to lifting of layers deposited after forming the color conversion layer such that an amount of liquid crystal molecules is insufficient in part of the display area, thereby causing an active unfilled area (AUA) defect in which a light leakage phenomenon is generated. In other words, outgassing causes light loss in certain display areas of the liquid crystal display. Exemplary embodiments, described below, are directed to a color conversion panel for a liquid crystal display with reduced light leakage from outgassing. a method of manufacturing the color conversion panel, and a display device including the color conversion panel FIG. 1 is a cross-sectional view of a color conversion panel according to an exemplary embodiment of the present disclosure.

Referring to FIG. 1, a color conversion panel according to an exemplary embodiment includes a light blocking member disposed on a substrate 310. In the present exemplary embodiment, the light blocking member may include an organic layer 320 and a transflective layer 321 enclosing the organic layer 320. The transflective layer 321 may have a triple layer of indium tin oxide (ITO), silver (Ag), and indium tin oxide (ITO). The organic layer 320 may be a black matrix and may be an alignment key for forming other constituent elements among the manufacturing process while preventing external light reflection. The transflective layer 321 may further improve an effect of the external light prevention of the organic layer 320.

The transflective layer 321 may have a transflective characteristic, thereby transmitting a part of the light generated from a first color conversion layer 330R and a second color conversion layer 330G, that are described later, and reflecting the rest of light to the substrate 310. Here, the transflective characteristic may mean that the reflectivity for incident light is about 0.1% or more to about 70% or less, or about 30% or more to about 50% or less. In an exemplary embodiment, the above-described light blocking member may have a structure in which a metal and a transparent conductive layer, not the structure including the organic layer 320 and the transflective layer 321, are stacked. Thereby, the light blocking member may have a structure in which titanium, indium zinc oxide, aluminum, and indium tin oxide are sequentially stacked.

The first color conversion layer 330R and the second color conversion layer 330G may be disposed on the substrate 310, and each of the first color conversion layer 330R and the second color conversion layer 330G may be disposed adjacently between light blocking members adjacent to each other. An edge of the first color conversion layer 330R and an edge of the second color conversion layer 330G may overlap the light blocking member. A transmission layer 330B may be disposed on the substrate 310 on which the first color conversion layer 330R and the second color conversion layer 330G are not disposed. The light blocking member may be disposed between the transmission layer 330B and the first color conversion layer 330R and between the transmission layer 330B and the second color conversion layer 330G.

In this way, the light blocking member may define regions where the first color conversion layer 330R, the second color conversion layer 330G, and the transmission layer 330B that are adjacent to each other are disposed. The first color conversion layer 330R may include a plurality of red quantum dots 331R, and the second color conversion layer 330G may include a plurality of green quantum dots 331G. Light incident to the first color conversion layer 330R may be converted into red light by the red quantum dots 331R to be emitted from the first color conversion layer 330R, and light incident to the second color conversion layer 330G may be converted into green light by the green quantum dots 331G to be emitted from the second color conversion layer 330G.

In the present exemplary embodiment, a blue blocking filter 322 may be disposed between the first color conversion layer 330R and the substrate 310, and between the second color conversion layer 330G and the substrate 310.

The blue blocking filter 322 may block or absorb blue light supplied from a light assembly described later. The incident blue light from the light assembly which enters the first color conversion layer 330R and the second color conversion layer 330G may be converted into red or green light by the quantum dots. However, some blue light may not be converted, and may be emitted through the substrate 310. Accordingly, the blue blocking filter 322 may prevent the emitted red or green light and the blue light generated from the light assembly from being mixed. The blue blocking filter 322 may be a single layer or multiple layers.

In the present exemplary embodiment, the first and second color conversion layers 330R and 330G and the transmission layer 330B may include a photosensitive resin.

The quantum dots described in the present exemplary embodiment may be selected from a group II-VI compound, a group III-V compound, a group IV-VI compound, a group IV element, a group IV compound, and a combination thereof.

The group II-VI compound may be selected from: a two-element compound selected from a group of CdSe, CdTe, ZnS, ZnSe, ZnTe, ZnO, HgS, HgSe, HgTe, MgSe, MgS, and a mixture thereof; a three-element compound selected from a group of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound selected from a group of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The group III-V compound may be selected from: a two-element compound selected from a group of GaN, GaP, GaAs, GaSb, AlN, AlP, AlAs, AlSb, InN, InP, InAs, InSb, and a mixture thereof; a three-element compound selected from a group of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a four-element compound selected from a group of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The group IV-VI compound may be selected from: a two-element compound selected from a group of SnS, SnSe, SnTe, PbS, PbSe, PbTe, and a mixture thereof; a three-element compound selected from a group of SnSeS, SnSeTe, SnSTe, PbSeS, PbSeTe, PbSTe, SnPbS, SnPbSe, SnPbTe, and a mixture thereof; and a four-element compound selected from a group of SnPbSSe, SnPbSeTe, SnPbSTe, and a mixture thereof. The group IV element may be selected from a group of Si, Ge, and a mixture thereof. The group IV compound may be a two-element compound selected from a group of SiC, SiGe, and a mixture thereof.

In this case, the two-element compound, the three-element compound, or the four-element compound may exist in particles at a uniform concentration, or in the same particle while being divided into partially different concentration distributions. Alternatively, it may have a core/shell structure where one quantum dot encloses another quantum dot. An interface between the core and the shell may have a concentration gradient such that a concentration of an element existing in the shell gradually decreases closer to a center of the interface.

The quantum dot may have a full width at half maximum (FWHM) of the light-emitting wavelength spectrum that is less than about 45 nm, preferably less than about 40 nm, and more preferably less than about 30 nm. In this range, color purity or color reproducibility may be improved. In addition, since light emitted via the quantum dot is emitted in all directions, a viewing angle of light may be improved.

Further, the quantum dot is not specifically limited to have shapes that are generally used in the technical field related to the present invention, and more specifically, may have a shape such as a nanoparticle having a spherical shape, a pyramidal shape, a multi-arm shape, or a cubic shape, or may be a nanotube, a nanowire, a nanofiber, a planar nanoparticle, etc.

The transmission layer 330B may pass the predetermined light. The transmission layer 330B may allow transmission of blue light. The transmission layer 330B may be a polymer material transmitting blue light supplied from a light source (not shown) therethrough. That is, the transmission layer 330B corresponding to the region emitting the blue light may pass the incident blue light therethrough without a separate quantum dot. The transmission layer 330B may include a plurality of scattering members 332. The scattering members 332 may scatter the light incident to the transmission layer 330B to increase an amount of light emitted from the transmission layer 330B or to make frontal luminance and lateral luminance uniform. Although not shown, at least one layer among the first color conversion layer 330R and the second color conversion layer 330G may further include a scattering member described in the transmission layer 330B to scatter the incident light.

For example, the scattering members 332 may include at least one selected from TiO2, Al2O3, and SiO2, but it is not limited thereto.

The transmission layer 330B may further include a blue pigment. The above-described scattering member 332 may reflect the external light such that the contrast ratio may be deteriorated. In order to address this problem, the blue pigment may be added in the transmission layer 330B. The blue pigment may absorb at least one among the red light and the green light included in the external light.

As described above, the color conversion panel according to the present exemplary embodiment may include the quantum dot having a self-emission characteristic and a narrow emission spectrum such that a wide viewing angle and high color reproducibility may be realized.

A capping layer 340 may be disposed on the light blocking member, the first and second color conversion layers 330R and 330G, and the transmission layer 330B. The capping layer 340 may be formed to prevent the first and second color conversion layers 330R and 330G and the transmission layer 330B from being damaged by following processes after forming the first and second color conversion layers 330R and 330G and the transmission layer 330B. In detail, in the process after forming the first and second color conversion layers 330R and 330G, the quantum dots may be damaged or quenched by moisture, but a high temperature process in forming of the first and second color conversion layers 330R and 330G, and the capping layer 340 may prevent these problems.

The capping layer 340 may be an inorganic material, for example, silicon nitride, or may be omitted.

A planarization layer 350 may be disposed on the capping layer 340. The planarization layer 350 may reduce a step generated as a height of the upper surface of the capping layer 340 is differentiated depending on the region.

A light filtering layer 380 may be disposed on the planarization layer 350. The light filtering layer 380 may increase light efficiency by reflecting the light generated from the first and second color conversion layers 330R and 330G. In detail, the light filtering layer 380 may allow the transmission of the blue light while reflecting the red light and the green light. Thus, the blue light from the blue light emitting diode (LED) that is incident to the quantum dot may be transmitted through the light filtering layer 380 so that the quantum dot may emit the light corresponding to each color. For example, the red light or the green light generated from the quantum dot may be emitted in all directions such that the light is also emitted in the direction where the blue light emitting diode (LED) is disposed, and in this case, this light is reflected by the light filtering layer 380 and the reflected light may be emitted to the outside through the substrate 310.

The light filtering layer 380 may include a plurality of layers, and the plurality of layers may have a structure in which at least two or more layers having different refractive indexes from each other are alternately arranged in a direction substantially perpendicular to the substrate 310. For example, the light filtering layer 380 may have a structure in which a silicon oxide layer ($SiO_x$) and a silicon nitride layer ($SiN_y$) are alternately arranged. Alternatively, as examples of a material having a relatively high refractive index, titanium oxide, tantalum oxide, hafnium oxide, or zirconium oxide may be used, and as an example of a material having a relatively low refractive index, $SiCO_z$ may be used. In $SiO_x$, $SiN_y$, and $SiCO_z$, x, y, and z as factors determining the chemical composition ratio may be controlled depending on process conditions when forming the layers.

A number of layers of the light filtering layer 380 in which the layers having the different refractive indexes from each other are alternately arranged may be about ten layers to twenty layers. However, it is not limited thereto, and as long as the light generated from the first and second color conversion layers 330R and 330G is reflected to increase the light transmission efficiency, the number of layers may not be limited thereto.

If the light filtering layer 380 is formed between the first and second color conversion layers 330R and 330G and the planarization layer 350, the light filtering layer 380 may have a step in a separation space respectively formed between the first color conversion layer 330R and the adjacent second color conversion layer 330G, between the first color conversion layer 330R and the adjacent transmission layer 330B, and between the second color conversion layer 330G and the adjacent transmission layer 330B. Here, the light filtering layer 380 may be formed by repeatedly depositing the layers having different refractive indexes from each other through a process method, such as a chemical vapor deposition, on an entire surface, and since the light filtering layer 380 is also formed in the above-described separation space, a phenomenon that the light filtering layer 380 is lifted may be generated. When the phenomenon that the light filtering layer 380 is lifted is generated, the gas may be emitted through the lifted part of the light filtering layer 380.

However, if the light filtering layer 380 is deposited on the planarization layer 350 after the planarization layer 350 is formed, the light filtering layer 380 may be formed to be substantially flat without the step. Accordingly, the gas emitted from the layer formed of the organic material may be reduced.

An insulating layer 390 may be disposed on the light filtering layer 380. The insulating layer 390 may be a silicon nitride layer. The insulating layer 390 may serve as an etching preventing layer. In this case, the insulating layer 390 and the light filtering layer 380 may be in contact with each other. The first layer closest to the insulating layer 390 among the plurality of layers included in the light filtering layer 380 may be the silicon oxide layer.

A polarization layer 22 (also described as second polarizer 22 below) may be disposed on the insulating layer 390. The polarization layer 22 may polarize the light incident from the light assembly (not shown). The polarization layer 22 may be a coating type of polarizer, a wire grid polarizer, or the like. The polarization layer 22 may be formed by various methods such as a film type, a coating type, and an adhesion type, but is not limited thereto.

A protection layer 400 may be disposed on the polarization layer 22. The protection layer 400 may electrically insulate a later-described common electrode 270 and the polarization layer 22.

In the present exemplary embodiment, an outlet 450 penetrating the protection layer 400, the polarization layer 22, the insulating layer 390, and the light filtering layer 380 may be formed on the planarization layer 350. The outlet 450 may allow the gas generated from the first and second color conversion layers 330R and 330G and the transmission layer 330B to escape to the outside. The outlet 450 may overlap the above-described light blocking member in a direction substantially perpendicular to the substrate 310. The outlet 450 may overlap the light blocking member included in the color conversion panel. However, when the color conversion panel is formed along with the display device, the outlet 450 may be formed at a position overlapping a light blocking part formed in the display panel, and the light blocking part formed in the display panel may overlap a gate line, a data line, and a thin film transistor. This will be described in the display device according to an exemplary embodiment of FIG. 13 and FIG. 14.

A common electrode 270 may be disposed on the protection layer 400, and the common electrode 270 may cover the side surface of the protection layer 400, the polarization layer 22, the insulating layer 390, and the light filtering layer 380, as well as the upper surface of the planarization layer 350 in the outlet 450. In FIG. 1, the outlet 450 penetrates the light filtering layer 380. However, a penetration depth of the outlet 450 may be controlled. As the depth of the outlet 450 is deeper, the gas discharge effect by the outgassing may increase.

Next, an example of a method for manufacturing the above-described color conversion panel will be described.

FIG. 2, FIG. 3, FIG. 4, FIG. 5, FIG. 6, FIG. 7, FIG. 8, and FIG. 9 are cross-sectional views showing an example of a method for manufacturing a color conversion panel according to an exemplary embodiment of the present disclosure.

Figure 2:
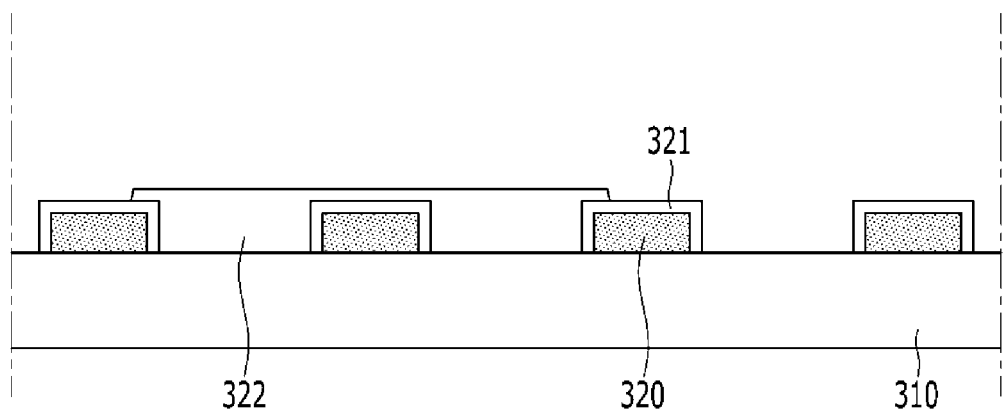
FIG. 2, FIG. 3, FIG. 4, FIG. 5, FIG. 6, FIG. 7, FIG. 8, and FIG. 9 are cross-sectional views showing an example of a method for manufacturing a color conversion panel according to an exemplary embodiment.

Referring to FIG. 2, a light blocking member including an organic layer 320 and a transflective layer 321 may be formed on the substrate 310. An organic layer 320 may be formed by a photolithography process, and indium tin oxide (ITO), silver (Ag), and indium tin oxide (ITO) may be sequentially coated on the substrate 310 to cover the organic layer 320 by selecting one among various deposition methods. Next, the transflective layer 321 covering the organic layer 320 may be formed by an etching process.

Next, a blue blocking filter 322 may be formed on the substrate 310, and the blue blocking filter 322 may be formed at the portion overlapping the first color conversion layer 330R and the second color conversion layer 330G that are described later in FIG. 4.

Figure 3:
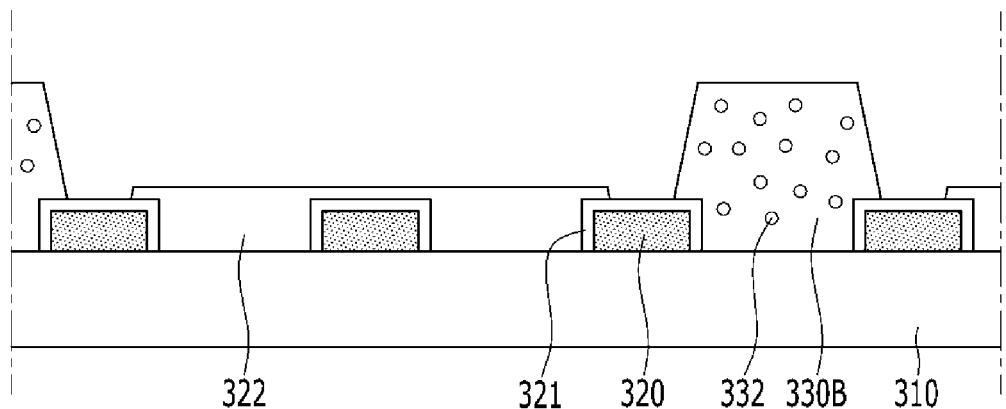

Referring to FIG. 3, the transmission layer 330B may be formed between adjacent light blocking members to not overlap the portion where the blue blocking filter 322 may be formed. The transmission layer 330B may be formed to include a plurality of scattering members 332.

Figure 4:
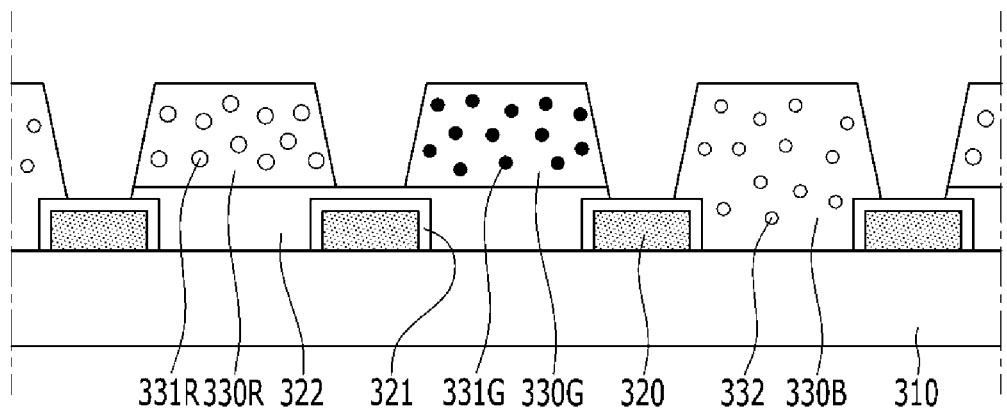

Referring to FIG. 4, a first color conversion layer 330R including a plurality of red quantum dots 331R and a second color conversion layer 330G including a plurality of green quantum dots 331G may be formed on the blue blocking filter 322.

Figure 5:
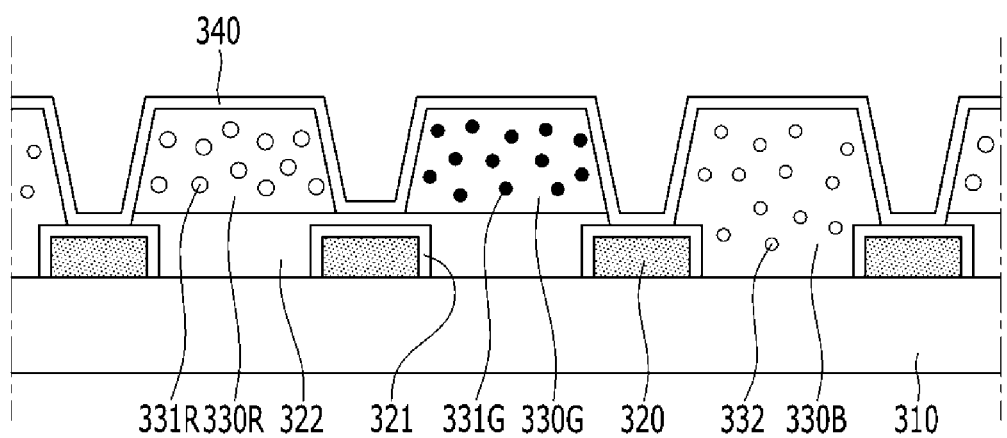
Figure 6:
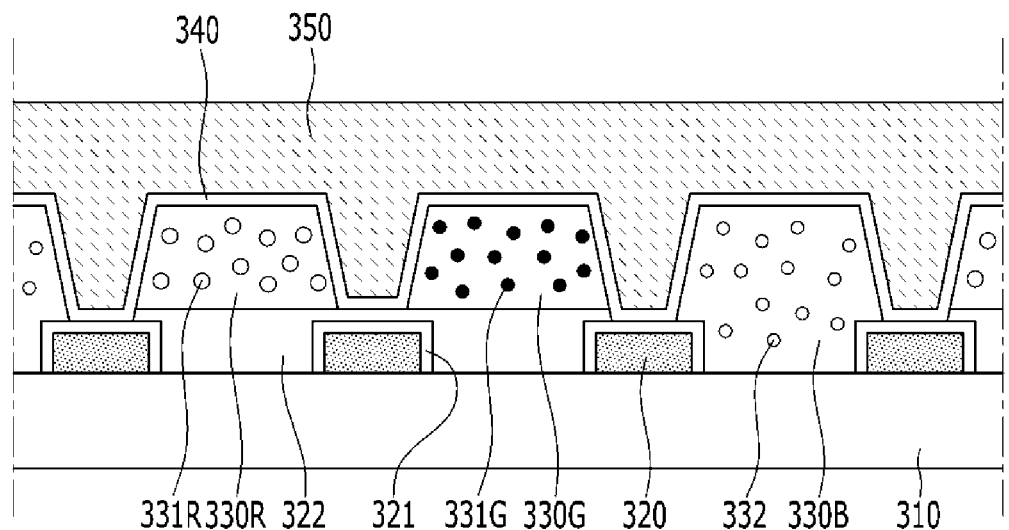

Referring to FIG. 5, a capping layer 340 may be formed on the substrate 310 to cover the first and second color conversion layers 330R and 330G, the transmission layer 330B, and the light blocking member, and referring to FIG. 6, a planarization layer 350 may be formed on the capping layer 340.

Figure 7:
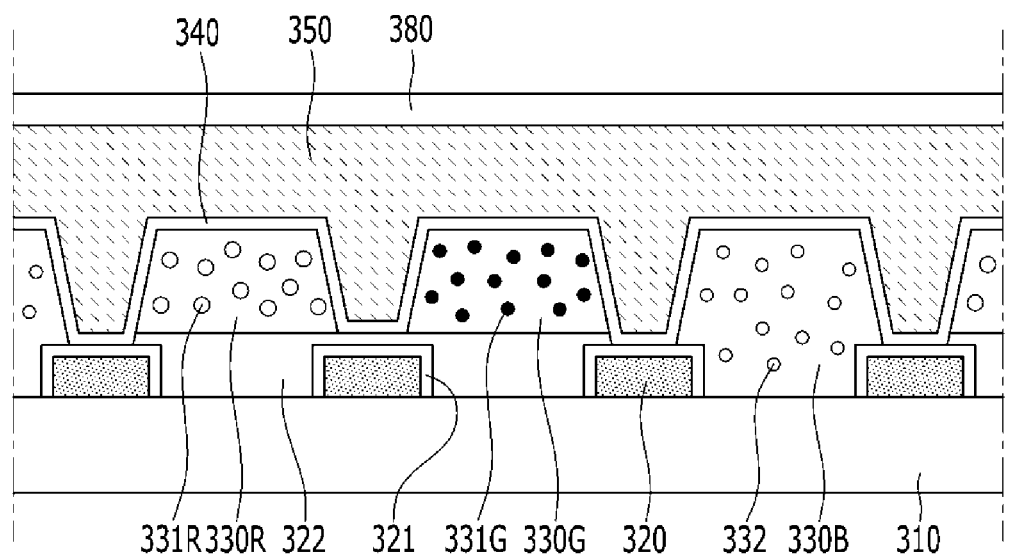
Figure 8:
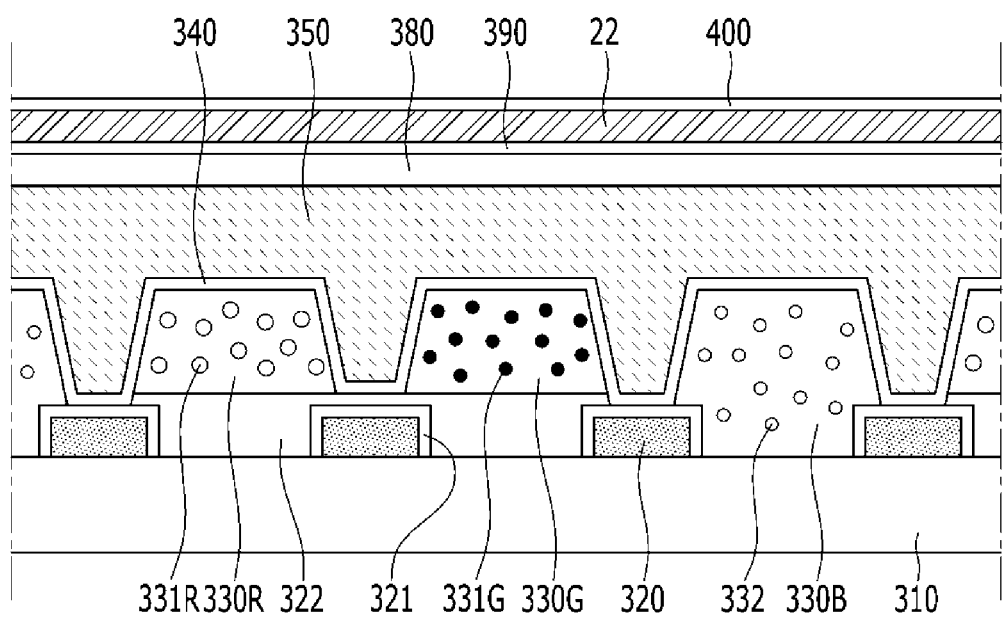

Referring to FIG. 7, a light filtering layer 380 may be formed on the planarization layer 350, and referring to FIG. 8, an insulating layer 390, a polarization layer 22, and a protection layer 400 may be sequentially formed on the light filtering layer 380. The light filtering layer 380 may be formed by depositing the layers having the different refractive indexes from each other, and as an example, the light filtering layer 380 may be formed by alternately stacking the silicon nitride layer and the silicon oxide layer. When the insulating layer 390 is the silicon nitride layer, the uppermost layer of the light filtering layer 380 may be the silicon oxide layer.

In an exemplary embodiment, the above-described insulating layer 390 may be omitted, and in this case, the uppermost layer of the light filtering layer 380 may be the silicon nitride layer.

Figure 9:
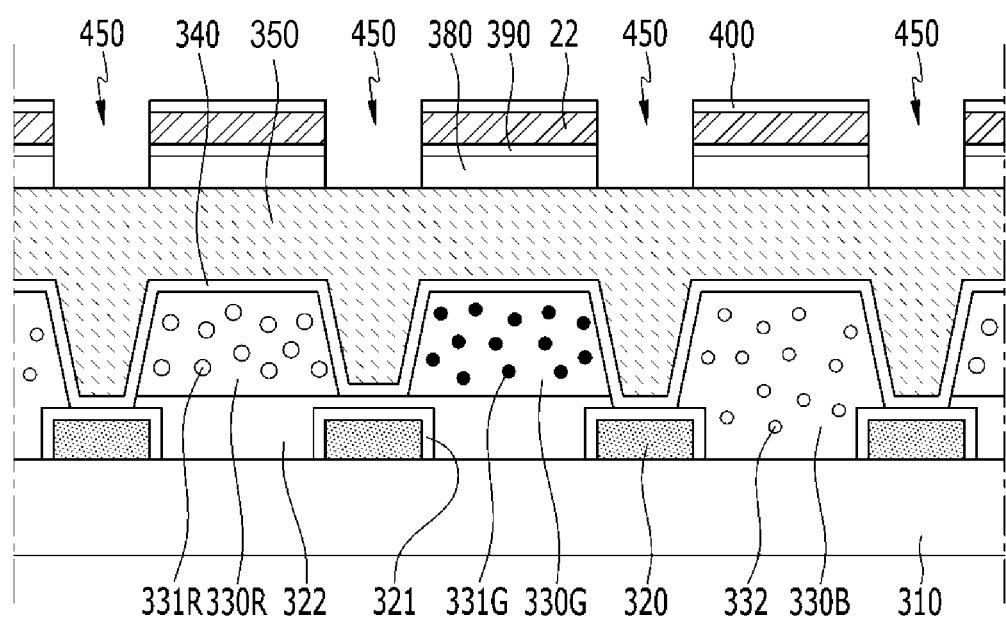

Referring to FIG. 9, an outlet 450 may be formed to penetrate the protection layer 400, the polarization layer 22, the insulating layer 390, and the light filtering layer 380. The outlet 450 may be formed by a method such as dry etching, and the outlet 450 may be disposed at the portion overlapping the light blocking member in the direction substantially perpendicular to the substrate 310. As above-described, by forming the outlet 450 to overlap the light blocking member, even if the after-described common electrode 270 is disposed in the outlet 450, it may be possible to prevent a problem in electric field formation.

The outlet 450 may be formed in plural, and at least one outlet 450 may be formed for each pixel area or the outlet 450 may be formed in any one region selected among a red pixel area, a green pixel area, and a blue pixel area.

Next, by forming the common electrode 270 to cover the outlet 450 on the protection layer 400, the color conversion panel shown in FIG. 1 may be formed. In the color conversion panel manufacturing method according to the present exemplary embodiment, since the outlet 450 may be formed before forming the common electrode 270, the gas may be discharged before the outlet 450 is covered by the common electrode 270. The gas discharge may be naturally realized by a temporal interval between the step of forming the outlet 450 and the step of forming the common electrode 270.

If the gas is not discharged and remains, when forming a liquid crystal layer after forming the color conversion panel, the gas may occupy a space to be filled with the liquid crystal material such that the amount of liquid crystal material is insufficient at part of the display area, thereby causing the light leakage phenomenon.

The display device including the above-manufacturing color conversion panel may be formed and the display device may be formed by forming the display panel including a thin film transistor, etc., overlapping the display panel and the color conversion panel, and then forming a liquid crystal layer between the display panel and the color conversion panel.

Next, an exemplary embodiment of the color conversion panel described in FIG. 1 will be described.

Figure 10:
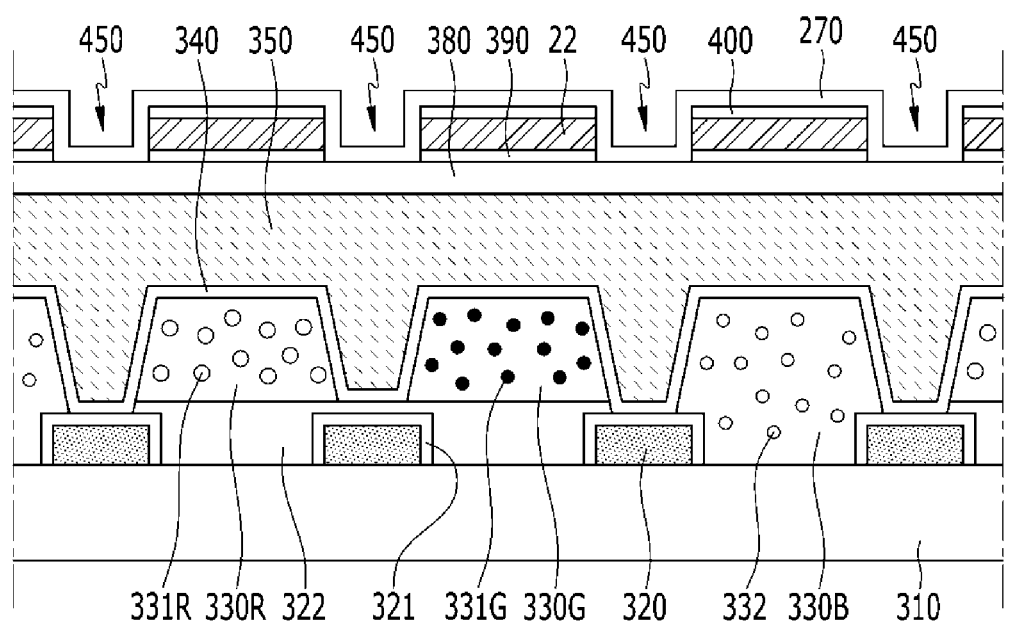
FIG. 10 is a cross-sectional view of an exemplary variation of the color conversion panel described in FIG. 1.
Figure 11:
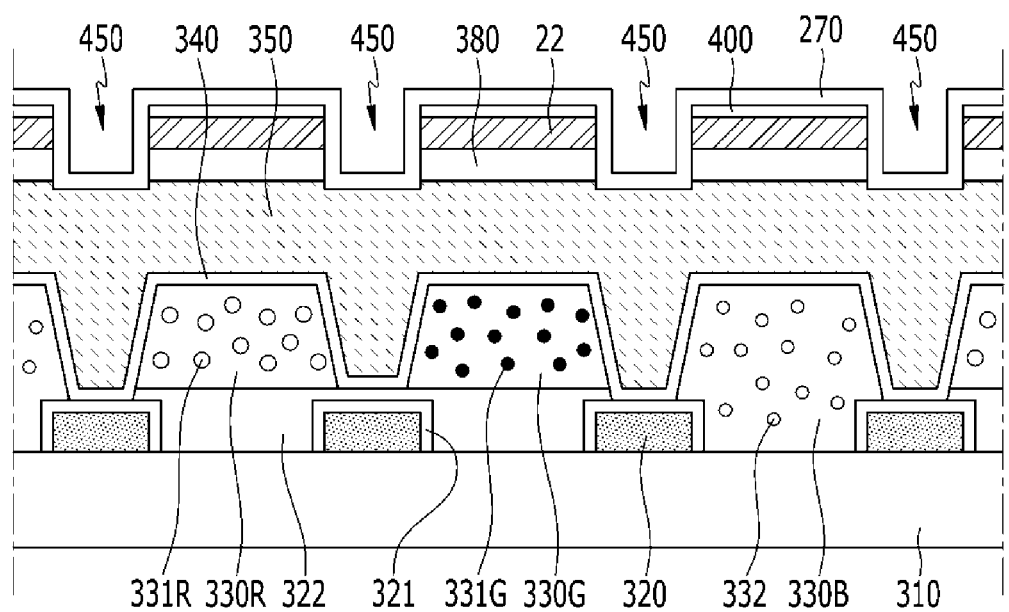
FIG. 11 is a cross-sectional view of an exemplary variation of the color conversion panel described in FIG. 1.
Figure 12:
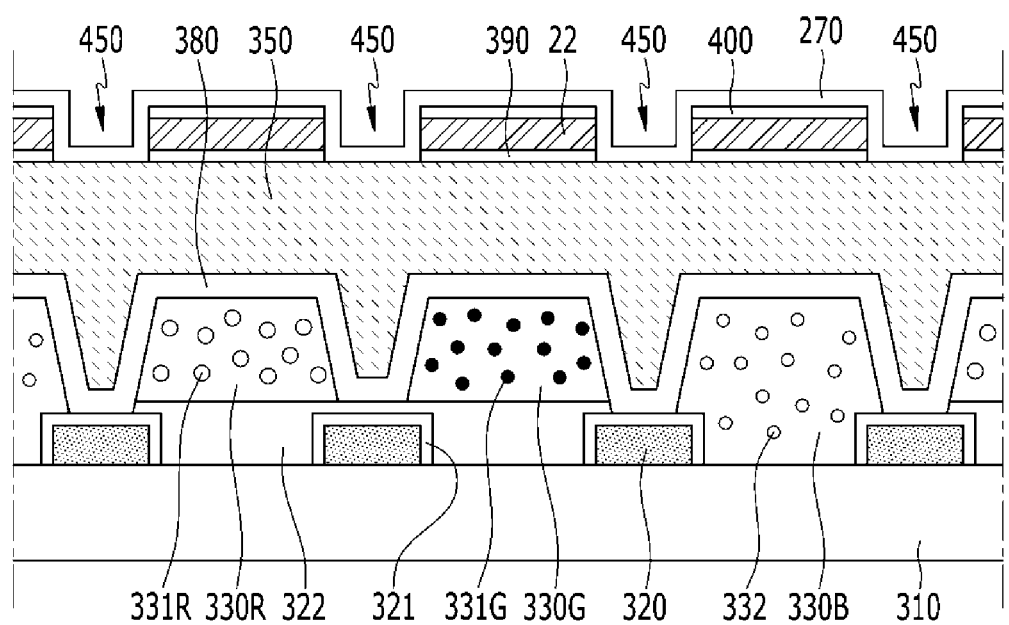
FIG. 12 is a cross-sectional view of an exemplary variation of the color conversion panel described in FIG. 1.

FIG. 10 is a cross-sectional view of an exemplary variation of the color conversion panel described in FIG. 1. FIG. 11 is a cross-sectional view of an exemplary variation of the color conversion panel described in FIG. 1. FIG. 12 is a cross-sectional view of an exemplary variation of the color conversion panel described in FIG. 1.

The exemplary embodiments shown in FIG. 10 to FIG. 12 is the same as most of the exemplary embodiment shown in FIG. 1 such that differences will be described.

Referring to FIG. 10, different from the exemplary embodiment described in FIG. 1, the outlet 450 does not penetrate the light filtering layer 380, but penetrates the protection layer 400, the polarization layer 22, and the insulating layer 390.

Referring to FIG. 11, the insulating layer 390 described in the exemplary embodiment of FIG. 1 is omitted. The insulating layer 390 may have a function of an etching preventing layer and the insulating layer 390 having this function is omitted such that the outlet 450 may be formed at a region where a part of the upper surface of the region planarization layer 350 is depressed.

Referring to FIG. 12, the light filtering layer 380 described in the exemplary embodiment FIG. 1 may be disposed under the planarization layer 350. In this case, although the light filtering layer 380 may be respectively formed while having the step in the separation space between the first color conversion layer 330R and the adjacent second color conversion layer 330G, between the first color conversion layer 330R and the adjacent transmission layer 330B, and between the second color conversion layer 330G and the adjacent transmission layer 330B such that the phenomenon where the light filtering layer 380 is lifted may occur, the gas may be discharged through the above-described outlet 450, thereby reducing the AUA (active unfilled area) defect.

Figure 13:
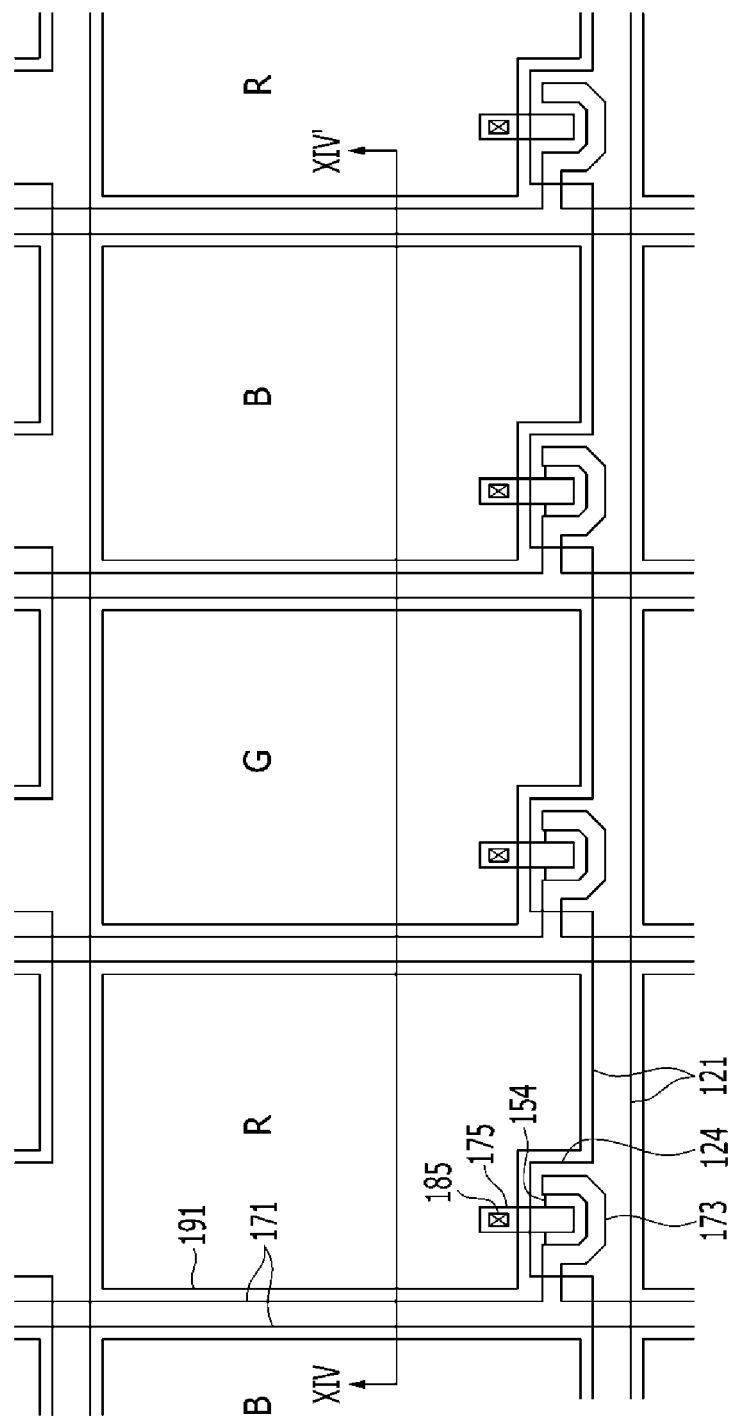
FIG. 13 is a top plan view showing a display device according to an exemplary embodiment.
Figure 14:
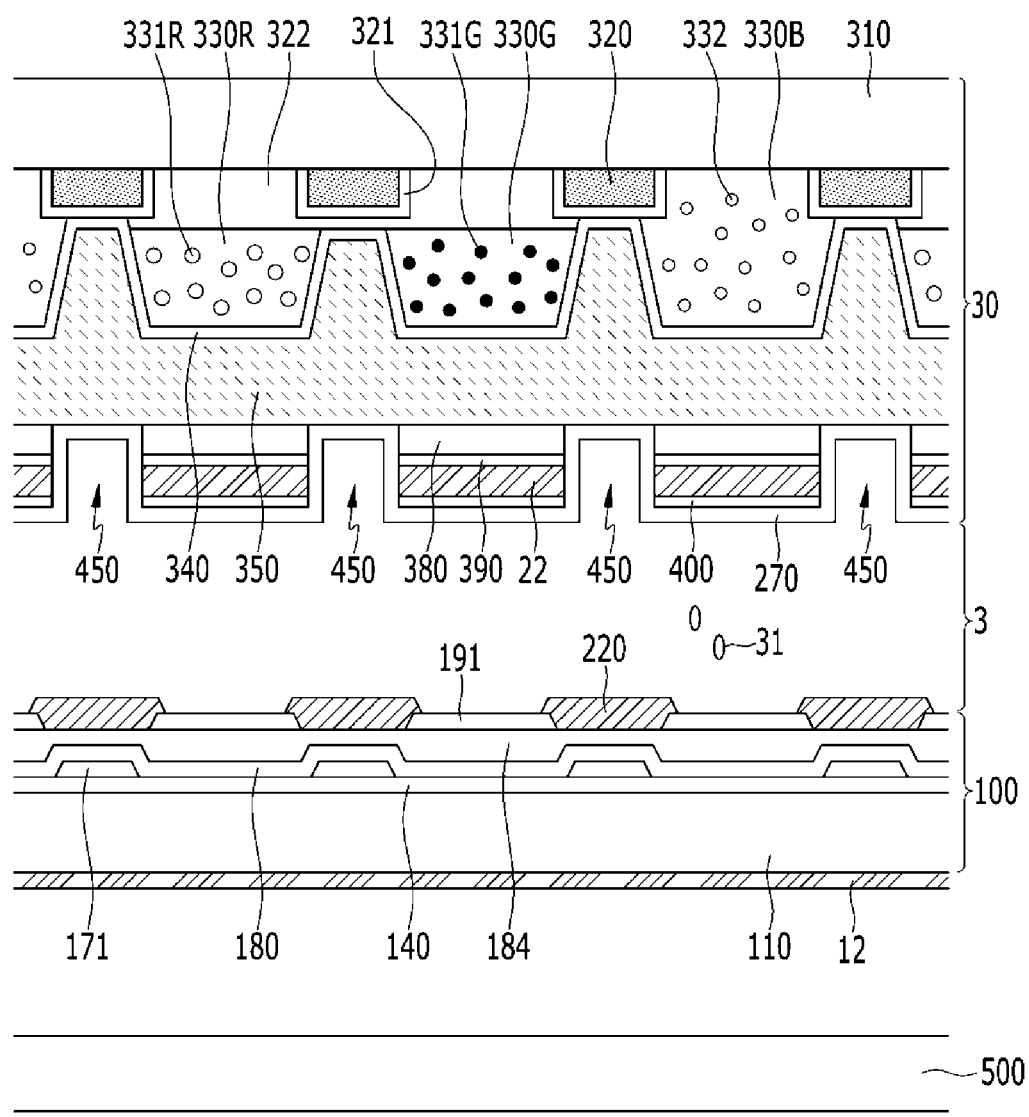
FIG. 14 is a cross-sectional view taken along line XIV-XIV' of FIG. 13.

FIG. 13 is a top plan view showing a display device according to an exemplary embodiment of the present disclosure. FIG. 14 is a cross-sectional view taken along a line XIV-XIV' of FIG. 13.

Referring to FIG. 13 and FIG. 14, the display device according to the present exemplary embodiment includes a light assembly 500, a display panel 100, a color conversion panel 30, and a liquid crystal layer 3. The light assembly 500 may be disposed adjacent to the display panel 100 to supply the light passing along the display panel 100, the liquid crystal layer 3, and the color conversion panel 30. The liquid crystal layer 3 may be disposed between the display panel 100 and the color conversion panel 30 and has a liquid crystal material including a plurality of liquid crystal molecules 31.

The light assembly 500 may include a light source generating the light and a light guide (not shown) receiving the light generated from the light source to guide the light in a direction in which the display panel 100 and the color conversion panel 30 are disposed.

The light assembly 500 may include at least one light emitting diode (LED), and as one example, it may be a blue light emitting diode (LED), however it may include a white light source or an ultraviolet ray light source instead of the blue light emitting diode (LED). However, only the display device using the light assembly 500 including the blue light emitting diode (LED) will be described.

The display device according to an exemplary embodiment may include a first polarizer 12 disposed under the display panel 100.

Next, the display panel 100 will be described in detail.

Referring to FIG. 13 and FIG. 14, the display panel 100 includes a gate line 121 extending in a row direction on a first substrate 110 and including a gate electrode 124, a gate insulating layer 140 disposed on the gate line 121, a semiconductor layer 154 disposed on the gate insulating layer 140, a data line 171 disposed on the semiconductor layer 154 and extending in a column direction, a source electrode 173 connected to the data line 171, a drain electrode 175 facing the source electrode 173, a passivation layer 180 disposed on the data line 171 and the drain electrode 175, and a pixel electrode 191 electrically connected to the drain electrode 175 through a contact hole 185 of the passivation layer 180 and disposed on the passivation layer 180. Pixel electrodes 191 may be disposed in a matrix shape, but the shape and the arrangement of the pixel electrodes 191 may be changed.

A pixel electrode 191 may be formed for each pixel area to be in plural, and a light blocking portion 220 is disposed between the pixel electrodes 191 among the plurality of pixel electrodes 191. The light blocking portion 220 may serve as a light blocking layer between color patterns corresponding to the adjacent pixel areas, thereby serving a function of preventing light leakage and increasing a contrast ratio. The light blocking portion 220 may overlap the gate line 121 and the data line 171, and may overlap a later-described thin film transistor.

The semiconductor layer 154 disposed on the gate electrode 124 may form a channel layer between the source electrode 173 and the drain electrode 175, and the gate electrode 124. The semiconductor layer 154, the source electrode 173, and the drain electrode 175 may form one thin film transistor.

Next, the color conversion panel 30 will be described.

The color conversion panel 30 overlapping the above-described display panel 100 may be the color conversion panel described in FIG. 1. The color conversion panel may be disposed on the display panel 100 in an inverted state to position the substrate 310 of the color conversion panel 30 far away from an uppermost part of the display panel 100 shown in FIG. 1. A common electrode 270 may be disposed on the liquid crystal layer 3 and a second polarizer 22 may be disposed on the common electrode 270, thereby forming an in-cell polarizer. If the in-cell polarizer is formed, the light path may be reduced. In this case, for electrical insulation of the common electrode 270 and the second polarizer 22, an insulating layer 390 may be interposed between the common electrode 270 and the second polarizer 22. The second polarizer 22 described in FIG. 14 may be the constituent element corresponding to the polarization layer 22 shown in FIG. 1.

Although not shown, an alignment layer may be formed between the liquid crystal layer 3 and the pixel electrode 191, and between the liquid crystal layer 3 and the common electrode 270. The first polarizer 12 disposed under the display panel 100 and the second polarizer 22 included in the color conversion panel 30 may polarize the light incident to the light assembly 500.

The common electrode 270 applying the common voltage may form an electric field along with the pixel electrode 191 such that each long axis of the liquid crystal molecules 31 disposed in the liquid crystal layer 3 may be inclined in a direction perpendicular or parallel to the electric field. The degree of the polarization of the light that is incident to the liquid crystal layer 3 may chang depending on the inclination degree of the liquid crystal molecules 31, and this change of polarization may appear as a change of transmittance by the polarizer so that the liquid crystal display may display images.

The contents for the color conversion panel described in FIG. 1 may all be applied to the present exemplary embodiment. Also, the color conversion panel described in FIG. 10, FIG. 11, and FIG. 12 may be applied to the display device according to the present exemplary embodiment.

The above-described display device may provide improved color reproducibility and contrast ratio through the color conversion panel. Also, an upper panel overlapping the display panel functioning as a lower panel is not separately formed, and the color conversion panel 30 may be functionality replaced with the upper panel. Accordingly, the display device according to the present exemplary embodiment has merits of providing a device with a thin thickness and reduced weight.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A color conversion panel, comprising:
   a substrate comprising a surface;
   a first color conversion layer and a second color conversion layer disposed on the surface of substrate;
   a planarization layer covering the first color conversion layer and the second color conversion layer and having a first surface;
   a polarization layer disposed on the first surface of the planarization layer;
   an electrode disposed on the polarization layer; and
   a light filtering layer disposed between the planarization layer and the polarization layer,
   wherein an outlet penetrates the polarization layer and the light filtering layer,
   wherein the light filtering layer comprises a plurality of layers, and the plurality of layers have a structure in which two or more layers having different refractive indexes are alternately arranged, and the electrode overlaps the first surface of the planarization layer in the outlet, and
   wherein the first surface of the planarization layer exposed by the outlet is parallel to the surface of the substrate.

2. The color conversion panel of claim 1, further comprising a protection layer disposed on the polarization layer, wherein the outlet penetrates the protection layer and the polarization layer.

3. The color conversion panel of claim 2, wherein the electrode covers a side surface of the polarization layer and a side surface of the protection layer in the outlet.

4. The color conversion panel of claim 1, further comprising an insulating layer disposed between the light filtering layer and the polarization layer.

5. The color conversion panel of claim 4, wherein a first layer closest to the insulating layer, among the plurality of layers included in the light filtering layer, is a silicon oxide layer, and
   the insulating layer is a silicon nitride layer.

6. The color conversion panel of claim 1, wherein the light filtering layer and the polarization layer are in contact with each other, and a first layer closest to the polarization layer, among the plurality of layers included in the light filtering layer, is a silicon nitride layer.

7. The color conversion panel of claim 1, further comprising a transmission layer disposed on the substrate.

8. The color conversion panel of claim 7, wherein the transmission layer comprises a plurality of scattering members.

9. The color conversion panel of claim 1, further comprising a light blocking member disposed between the first color conversion layer and the second color conversion layer, wherein the light blocking member has a dual layer of an organic layer and a transflective layer.

10. The color conversion panel of claim 9, wherein the outlet overlaps the light blocking member.

11. The color conversion panel of claim 10, wherein the transflective layer has a triple layer of indium tin oxide (ITO), silver (Ag), and indium tin oxide (ITO).

12. A method for manufacturing a color conversion panel, comprising:
    forming a first color conversion layer and a second color conversion layer on a surface of a substrate;
    forming a planarization layer to cover the first color conversion layer and the second color conversion layer;
    forming a light filtering layer between the planarization layer and the insulating layer;
    forming a polarization layer on a first surface of the planarization layer;
    forming an outlet to penetrate the polarization layer and the light filtering layer; and
    forming an electrode on the polarization layer to cover the outlet,
    wherein the light filtering layer is formed by stacking at least two or more layers having different refractive indexes from each other,
    wherein the electrode overlaps the first surface of the planarization layer in the outlet, and
    wherein the first surface of the planarization layer exposed by the outlet is parallel to the surface of the substrate.

13. The method of claim 12, further comprising:
    forming an insulating layer between the planarization layer and the polarization layer; and
    forming a protection layer on the polarization layer,
    wherein the outlet penetrates the protection layer, the polarization layer, and the insulating layer.

14. The method of claim 12, further comprising forming a light blocking member on the substrate before forming the first color conversion layer and the second color conversion layer,
    wherein the light blocking member is disposed between the first color conversion layer and the second color conversion layer, and
    wherein the forming of the light blocking member comprises forming an organic layer on the substrate and forming a transflective layer on the organic layer.

15. A display device, comprising:
    a display panel;
    a color conversion panel overlapping the display panel; and
    a liquid crystal layer disposed between the display panel and the color conversion panel and comprising a liquid crystal material,
    wherein the color conversion panel comprises:
    a substrate;
    a light blocking member disposed on the substrate;
    a first color conversion layer and a second color conversion layer disposed between the substrate and the liquid crystal layer;

a planarization layer disposed between the first color conversion layer and the liquid crystal layer and between the second color conversion layer and the liquid crystal layer and having a first surface;

a polarization layer disposed between the first surface of the planarization layer and the liquid crystal layer;

a light filtering layer disposed between the planarization layer and the polarization layer; and an electrode disposed between the polarization layer and the liquid crystal layer, wherein an outlet penetrates the polarization layer and the light filtering layer, and the electrode covers the outlet, wherein the light filtering layer comprises a plurality of layers, and the plurality of layers have a structure in which two or more layers having different refractive indexes are alternately arranged, and the electrode overlaps the first surface of the planarization layer in the outlet, and wherein at least a portion of the outlet overlaps the light blocking member.

16. The display device of claim 15, wherein the liquid crystal material is disposed in a space between the electrode disposed in the outlet and the liquid crystal layer.

17. The display device of claim 15, wherein:

the display panel comprises a thin film transistor, and the thin film transistor and the outlet overlap each other.

* * * * *